United States Patent [19]

Krolak et al.

[11] Patent Number: 4,615,615
[45] Date of Patent: Oct. 7, 1986

[54] LASER POSITIONING SYSTEM

[75] Inventors: Michael Krolak, Los Gatos; Michael R. Biche, Newark, both of Calif.

[73] Assignee: Flexible Manufacturing Systems, Inc., Los Gatos, Calif.

[21] Appl. No.: 655,341

[22] Filed: Sep. 27, 1984

[51] Int. Cl.$^4$ .............................................. G01C 3/10
[52] U.S. Cl. .......................................... 356/1; 901/35; 901/45; 901/47; 356/141
[58] Field of Search ................... 356/1, 4, 5, 141, 375, 356/373; 180/167; 901/35, 45, 47

[56] References Cited

U.S. PATENT DOCUMENTS 3,714,657  1/1973  Lapeyre .............................. 356/1 X
4,568,182  2/1986  Modjallal ............................ 356/1

FOREIGN PATENT DOCUMENTS 80710  7/1981  Japan ..................................... 401/47

Primary Examiner—L. T. Hix
Assistant Examiner—D. Rutledge
Attorney, Agent, or Firm—Thomas E. Schatzel

[57] ABSTRACT

An optical positional sensing apparatus for providing precise position and approach angle of a mobile assembly with respect to a fixed assembly. The apparatus includes a light source and optics to produce a rotating horizontal beam. Optics and a transducer are included which can detect the light beam when reflected back on itself. A corner reflector is affixed to a piece of equipment to which the mobile assembly will travel. The beam is rotated by means of a drive motor. Light hitting the corner reflector is reflected directly back under three circumstances, i.e. when the beam strikes either corner or when the beam is perpendicular to the reflector. A rotary encoder is coupled to the drive mechanism and supplies continuous angular positional data to a microprocessor. The transducer is also coupled to the microprocessor which generates data sets of angular location for each transducer signal. Simple trigonometric calculations provide the desired position and approach angle data. An alternative embodiment includes a fixed optical assembly comprising three point light sources to replace the single, mobile-assembly mounted source and fixed reflector.

10 Claims, 7 Drawing Figures

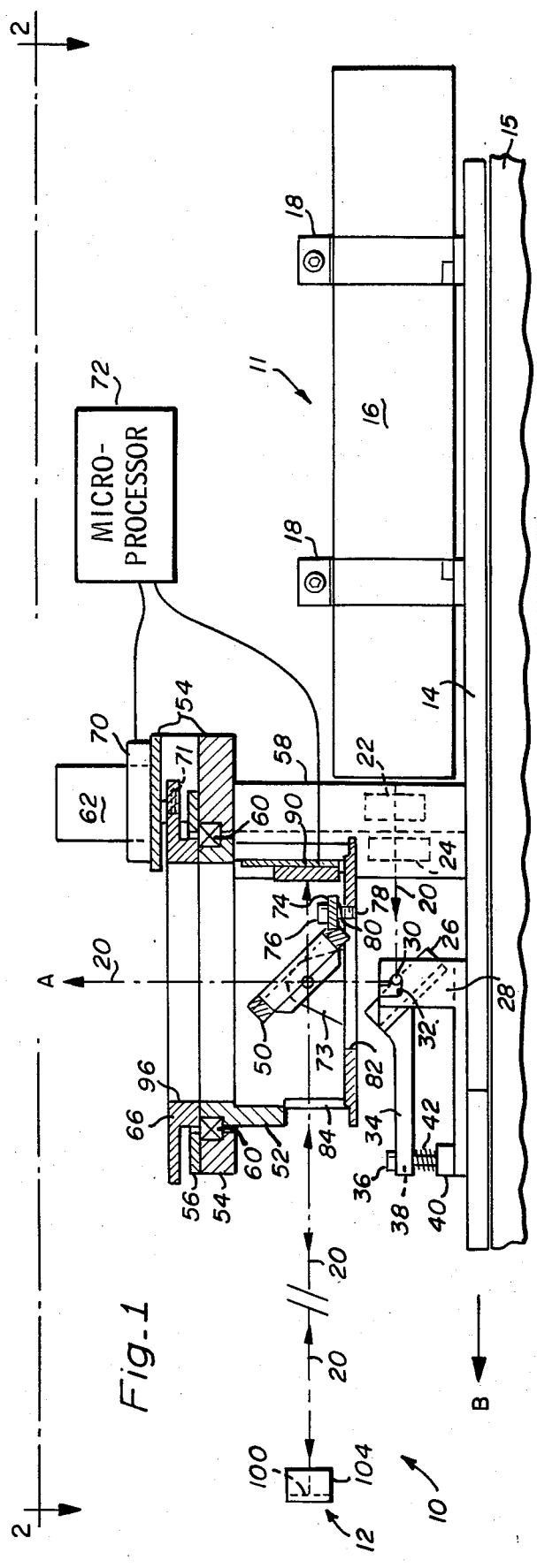
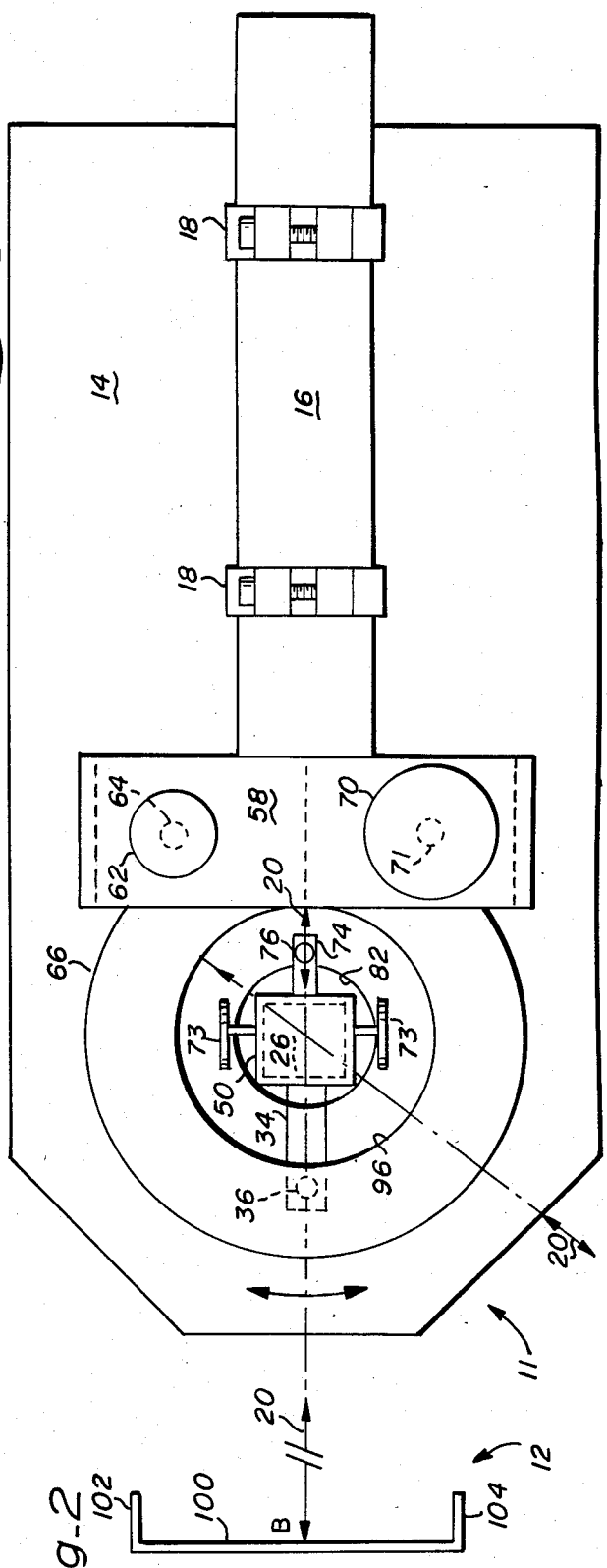

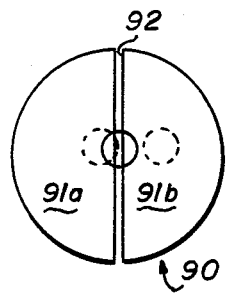
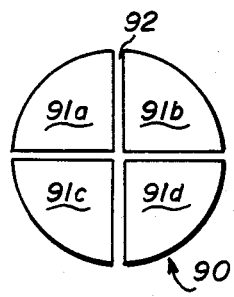
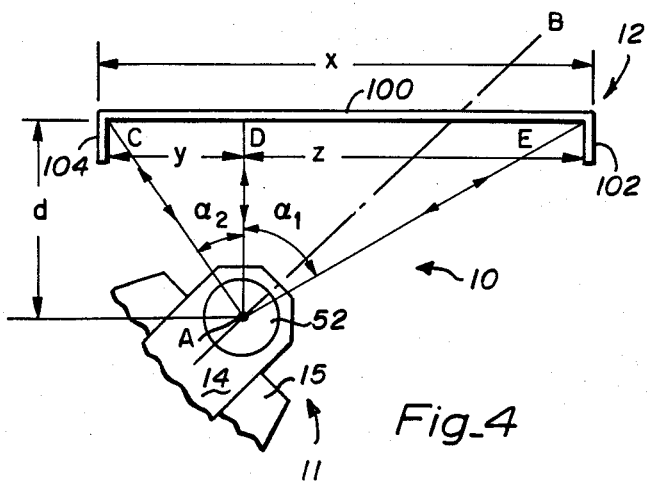
Fig_3  Fig_3A  Fig_4
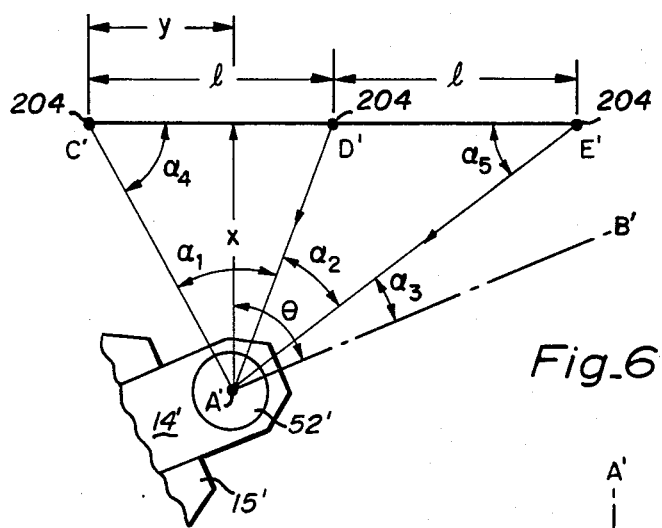
Fig_6
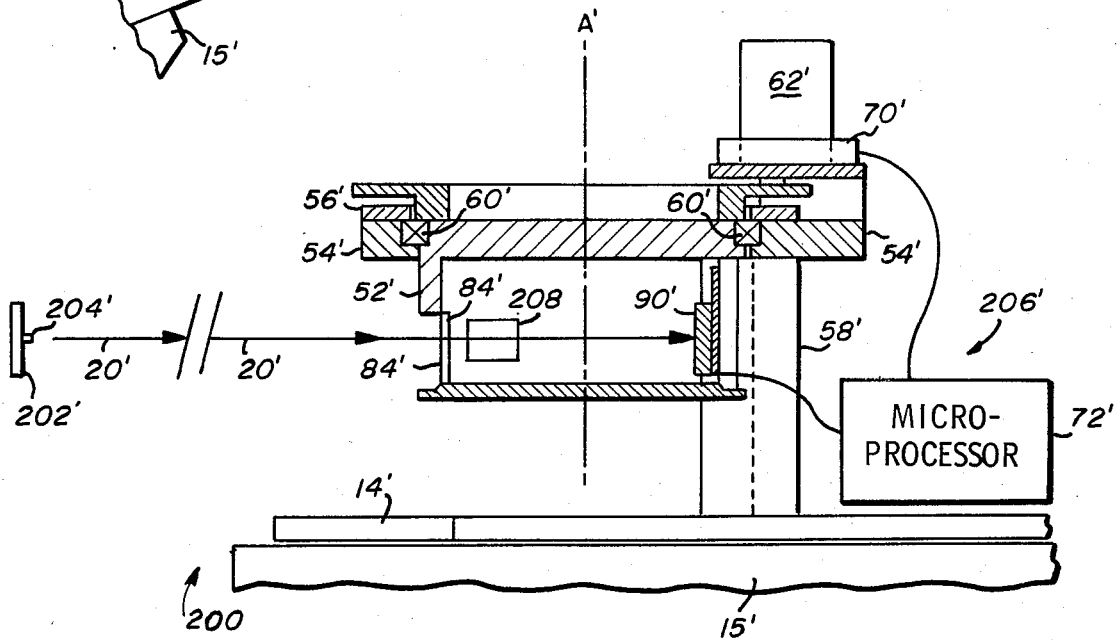
Fig_5

LASER POSITIONING SYSTEM

BACKGROUND OF THE INVENTION

1. Field of the Invention

The present invention relates generally to an apparatus for sensing position and more particularly to an optical system for resolving the position and approach angle of a moving assembly with respect to a fixed optical assembly.

2. Description of the Prior Art

The automatic transportation of particular objects from point to point within an enclosed environment is desirable in a number of industrial settings. Most notable of these includes transportation of silicon wafers from machine to machine in a clean room of a chip fabrication plant. Subsequent processing, for example, encapsulation of the chips may also be performed in a clean room and/or under semi-automatic conditions. Transportation of biohazardous or radioactive material under commerical, industrial or research conditions is also common. The environments in which these materials are found and utilized typically constitute single large rooms, e.g. clean rooms or isolation rooms, which are maintained under controlled conditions. Human manipulation is often contraindicated for reasons of safety, cleanliness, positive handling and labor costs.

These environments may have a number of machines at fixed locations within the room, to which and from which objects must be transported. Using the chip fabrication process example, it is often necessary to transport cassettes filled with wafers to and from several different processing machines. Depending on the types of chips being manufactured, the number and order of machines used will vary. Thus a fixed transportation system, e.g. a continuous belt system, may be impractical. Fixed systems additionally may unduly crowd the workplace, creating difficulties with access to the equipment.

Accordingly, a preferred mode of wafer transport within a fabrication clean room is a mobile transport unit, able to independently transfer cassettes filled with wafers between machines as needed. Such a unit would be self-propelled and computer directed to enable it to service any machine within the fab area. A robot arm would provide the means by which wafer cassettes are transferred to and from the machine and transport unit. Because the manipulations needed to transfer such cassettes require a high degree of positional control, it is advantageous to provide the mobile transport units with a positional sensing device which is independent of the main computer and which can direct the "docking" of the mobile unit with a machine.

SUMMARY OF THE PRESENT INVENTION

It is therefore an object of the present invention to provide a positional sensing apparatus for accurately resolving the position and approach angle of a moving assembly with respect to a fixed object.

It is a further object of the present invention to provide a positional sensing apparatus which is compact and light weight.

It is a further object of the present invention to provide a positional sensing apparatus which is operable in virtually any environment.

It is a further object of the present invention to provide a positional sensing apparatus which requires no mechanical connections or physical contact between the mobile and fixed assemblies.

Briefly, a preferred embodiment of the present invention comprises an optical positional sensing apparatus for mounting on a self-contained mobile transport unit. The apparatus includes a horizontally oriented laser light source and optics for focusing and directing the beam. The beam impinges upon a fixed mirror mounted at a forty-five degree angle which directs the beam upwardly towards a beam splitter, also mounted on a forty-five degree angle and parallel with the fixed mirror. The beam splitter splits the beam into two perpendicular components and is mounted in a rotating housing which may be rotated through approximately two hundred and forty degrees of arc.

Light from the fixed mirror is partially transmitted by the beam splitter, and partially reflected, at a ninety degree angle, out through a window in the rotating housing. The rotating housing is coupled to an optical encoder so that angular position of the housing may be precisely ascertained. The rotating housing also includes a split detector, mounted behind the splitter and perpendicular to the reflected beam component. The fixed object to which the mobile unit "docks" includes a reflecting assembly affixed to be at the same height as the beam. The reflecting surface comprises three reflective surfaces; a center surface and two edge surfaces, perpendicular to the center surface and parallel to each other.

Light from the laser light source passes from the fixed mirror through the beam splitter where a portion of the beam is transmitted and the remaining light is directed outwards from the rotating housing towards the reflective surface. Light impinging on the reflective surface will be reflected at the same angle. In most circumstances, light will be reflected away from the source, but in three instances light will be reflected directly back to the source. These are the situations where the reflective surface is perpendicular to the source, and when the source impinges on the corners formed by the intersections of the reflective surfaces. In each case light will be reflected back through the beam splitter and into the split detector, which signals a microprocessor. At each such point the rotary encoder is sampled, giving an accurate angular position of the beam. From these measurements a triangulation is made which yields position and approach angle of the mobile unit.

It is an advantage of the present invention that precise measurements of position and approach angle can be made.

It is another advantage of the present invention that the apparatus is compact and light weight.

It is another advantage of the present invention that no coupling is required between the mobile unit and the fixed unit.

It is another advantage of the present invention that the fixed units are easily fitted with the optical reflecting surfaces.

It is another advantage of the present invention that the apparatus will operate in a variety of environments.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a side view, partially in crosssections, of apparatus incorporating the present invention;

FIG. 2 is a top view of the apparatus of FIG. 1 taken along line 2—2;

FIG. 3 is a detailed illustration of a split detector;

FIG. 3A is an illustration of an alternative split detector;

FIG. 4 is an illustration of the geometry of the light paths from the reflective surface;

FIG. 5 a side view, partially in crosssections, of apparatus of an alternative embodiment of the present invention; and FIG. 6 is a side view illustration of the fixed assembly and light paths of the alternative embodiment of FIG. 5.

DETAILED DESCRIPTION OF THE PREFERRED EMBODIMENT

FIG. 1 illustrates an optical positioning apparatus of the present invention and referred to by the general reference character 10. The apparatus 10 comprises a mobile assembly 11 and a fixed optical assembly 12. The mobile assembly 11 includes a generally flat rectangular mounting plate 14 to which the various components may be secured. The plate 14 may then be positioned atop a mobile transport unit 15. Alternatively, the components may be directly attached to the mobile unit 15.

A laser light source 16 is securely attached to the plate 14 by a pair of clamps 18. It is important that the laser 16 be very rigidly attached so that vibration or impact will not cause misalignment of the laser 16. While a variety of laser light sources may be used, in the apparatus 10 the laser 16 is a Helium-Neon laser manufactured by Melles-Griot. A light beam 20 produced by the laser 16 may be directed through a beam expander 22 and beam attenuator 24 which, respectively reduce the size and intensity of the beam 20. Depending upon the type of laser 16 utilized, the expander 22 and attenuator 24 may be omitted. The beam 20 is next directed to a fixed mirror 26, attached to the base 14, positioned to have a center colinear with the beam 20, and fixed at a forty-five degree angle to direct the beam 20 upwards. The fixed mirror 26 is supported by a pair of vertical brackets 28, arrayed on each lateral side thereof. The mirror 26 is pivotably mounted on the brackets 28 by a pair of pins 30 which extend from opposite lateral sides of the mirror 26 and rest in a slot 32 in each bracket 28. An arm 34 is secured to and extends horizontally back from the mirror 26. A screw 36 is inserted through an aperture 38 formed in the distal end of the arm 34. The screw 36 is threaded into a threaded base 40, and a compression spring 42 is positioned about the screw 36 and intermediate to the lever 34 and base 40. Fine adjustments to the angle of the mirror 26 may be made by turning the screw 36, which causes the arm 34 to pivot about the pins 30. In the apparatus 11, the base 40 and brackets 28 comprise a single unitary piece, however, these components may be fabricated separately and each attached to the plate 14 or mobile unit 15.

From the fixed mirror 26, the beam 20 is directed upwards to a beam splitter 50, also positioned at a forty-five degree angle to the vertical, and with a center coaxial with a vertical component of the beam 20.

The beam splitter 50 is mounted within a hollow cylindrical rotatable housing 52, which is positioned over the mirror 26 and which has a central axis of rotation A coaxial with the vertical component of the beam 20. The housing 52 is mounted about a pair of support rings 54 and 56 which are in turn supported by a U-shaped upright frame 58. The frame 58 is mounted to the support plate 14, perpendicular to a central longitudinal axis B of the mobile unit 15 and positioned intermediate to the laser 16 and the mirror 26, as shown also in FIG. 2. A plurality of bearings 60 are interposed between the cylindrical housing 52 and the support rings 54 and 56 to reduce the frictional engagement therebetween.

Reciprocating rotary motion is supplied to the housing 52 by means of a motor 62, positioned atop the support ring 54. A gear 64 is attached to the motor 62 and engages an annular gear 66 affixed to the housing 52. Also engaged with the annular gear 66, is an incremental rotary encoder 70. The encoder 70 is mounted atop the support ring 54 in a manner similar to the motor 62, and includes a gear 71 which engages the annular gear 66. The encoder 70 is an optical type encoder although other types, may be employed as well, and supplies angular positional data to a microprocessor 72. It may be noted that while in the apparatus 10 a microprocessor 72 is employed to interpret and process data, any means known in the art may be used, including simpler dedicated circuitry or a central control unit. Further, it is not necessary that the same means be used to both interpret and process the data, but multiple components can be employed for separate functions.

The motor 62 imparts rotary motion to the housing 52 and thus to the beam splitter 50 mounted therewithin. The beam splitter 50 is mounted to be centered over the axis of rotation A, and is pivotably attached to a pair of lateral brackets 73. A lower edge of the beam splitter 50 includes an arm 74, projecting outward at a forty-five degree angle to the beam splitter and parallel with the bottom of the housing 52. A screw 76 is inserted through an aperture in the arm 74 and is threaded into a bore 78 in the bottom of the housing 52. A compression spring 80 is positioned around the screw 76 intermediate to the arm 74 and the bore 78, and supplies tension to the screw 76. The screw 76 functions analogously to the screw 36 to adjust the angle of the beam splitter 50.

A circular aperture 82 is formed in the bottom of the housing 52 to be coaxial with the central axis of rotation A. This aperture 82 forms the passage through which the beam 20 is conducted to the splitter 50 from the fixed mirror 26. A window 84 is positioned in a vertical wall of the housing 52 parallel to the axis of rotation A and in front of the beam splitter 50. Light from the laser 16 is directed, by the mirror 26 and beam splitter 50, through the window 84 to the fixed optical assembly 12. In three instances, hereinafter described, light returning from the fixed optical assembly 12 follows the same path, through the window 84 to the beam splitter 50. The housing 52 further includes a two axis split detector 90, shown also in FIG. 3, mounted behind the beam splitter 50 to have a central focal point colinear with the returning light beam 20. The split detector 90 is a photosensitive device comprising a pair of electrically isolated "dees" 91a 91b adjacent to a gap 92. Each dee 91a and 91b is capable of generating an electrical current which varies with the amount of light impinging thereon. The split detector 90 is positioned such that the gap 92 is opposite the window 84 and precisely aligned so that the gap 92 is colinear with the light beam 20 leaving the beam splitter 50. When the returning beam 20 is exactly centered on the detector 90, as indicated by the solid circle in FIG. 3, each dee 91a and 91b will produce an equal output which is detected by the microprocessor 72. If the light beam 20 is reflected back to the detector 90 slightly off-center, as indicated by the broken circles of FIG. 3, then unequal signals will be transmitted to the microprocessor 72. The split detector 90 thus ensures that the angle of the reflected light is precisely measured. It may be noted that for some applications a four axis split detector 90, illustrated in FIG. 3A and having individual detector section 91a, 91b, 91c, and 91d, may be employed. This detector can be used to detect vertical, as well as horizontal position of the reflected beam 20. Alternatively, in applications requiring less precision, the split detector may comprise an ordinary photodetector and a pinhole mask for reducing the beam size.

A portion of the light originating from the laser 16 is not directed towards the fixed optical assembly 12 by the beam splitter 50 but is transmitted through the beam splitter 50 and through an aperture 96 in the top of the housing 52. If desired, a reflective device (not shown) or an absorbing device (not shown) may be placed in the path of the transmitted beam 20 to ensure that it does not interfere with the detector 90.

The fixed optical assembly 12, illustrated in FIGS. 1, 2 and 4 consists simply of three reflective surfaces. A first surface 100 is positioned to be generally parallel to the axis of rotation A of the cylindrical housing 52 of the mobile assembly 11. Attached to each lateral edge of the first surface 100 is a second surface 102 and a third surface 104. The surfaces 102 and 104 each form precise ninety degree angles with the surface 100. The assembly 12 is attached to a fixed piece of equipment at a height approximately equal to the height of the aperture 84 of the mobile assembly 11.

Operation of the apparatus 10 is as follows. A light beam 20 from the laser is reflected by the fixed mirror 26 to the beam splitter 50 in the rotating housing 52. A portion of the beam 20 is transmitted by the beam splitter 50 and is dissipated. The remaining portion of the beam 20 is reflected by the beam splitter 50 towards the fixed optical assembly 12. Simultaneously, the housing 52 is swept back and forth in an approximately two hundred and forty degree arc. As illustrated in FIG. 4, there are three points on the assembly 12 wherein the beam 20 will be reflected directly back to the source. These points, designated C, D and E, occur when the beam 20 is perpendicular to the surface 100, and when the beam 20 is directed to the intersections of the surfaces 102 and 104 with the surface 100. At each location, the beam 20 will be reflected directly back through the beam splitter 50 and into the split detector 90. The split detector 90 signals the microprocessor 72 when the beam is exactly centered. Simultaneously, the rotary encoder 70 is providing continuous angular positional data to the microprocessor 72. The encoder 70 typically supplies a pulse every one hundredth of a degree of rotation, so highly accurate measurements may be taken.

The line formed by a ray DA will always be at right angles to the surface 100. The angles $\alpha_1$, and $\alpha_2$ are easily measured by the encoder 70 as the angular distances, from the point D, to points C and E respectively. The dimensions of the reflector 100 are known and the following calculations yield a distance d of the mobile unit 15 from the surface 100.

$$y = d \tan \alpha_2$$

$$z = d \tan \alpha_1$$

$$x = y + z = d (\tan \alpha_2 + \tan \alpha_1).$$

Therefore, $$d = \frac{x}{\tan \alpha_2 + \tan \alpha_1};$$

$$y = d \tan \alpha_2; \text{ and}$$

$$z = d \tan \alpha_1.$$

the angle $\theta$ of the central axis B of the mobile 15 with respect to the surface 100 is known by indexing the encoder 70 to the axis B, and by directly measuring the angle from the index to the point D.

It may be noted that while the apparatus 10 has been described utilizing a laser light source, other light source and optics combinations could be used. The main requirements are that the light source be sufficiently intense to provide an acceptable reflected signal to the detector and that the light be reasonably collimated such that the reflected "spot" on the detector is smaller than the detector itself. Additionally, "light" as used herein is not limited to those portions of the electromagnetic spectrum which are visible to the human eye, but may include additional frequencies and particularly the neighboring ultraviolet and infrared bands.

An alternative embodiment of the present invention is schematically illustrated in FIG. 5 and designated by the general reference character 200. Those elements of the embodiment 200 common to the embodiment 10 carry the same reference numeral distinguished by a prime designation. The apparatus 200 includes a fixed optical assembly 202 comprising three point light sources 204 which are mounted on the fixed equipment and which replace the laser 16 and fixed optical assembly 12. The sources 204 are discretely spaced about the fixed equipment, and can be equally or unequally spaced as desired. Each source 204 comprises a LED and a pinhole to mask the LED and create a point light source. The apparatus 202 further includes a mobile assembly 206, illustrated in FIG. 6. The assembly 206 is essentially the rotating housing 52' with split detector 90' affixed to an inside wall and window 84' positioned in a wall opposite the split detector 90'. Motor 62' rotates the housing 52' and rotary encoder 70' provides angular position of the housing 52' to microprocessor 72'. The housing 52' may also include focusing optics 208 positioned within the path of the incident light beams 20 to focus the light on the detector 90'. Operation of the apparatus 200 is similar to that of the apparatus 10.

The calculations of the distance d' of the mobile unit 15' to the fixed optical assembly 202 are slightly more complex than those of the embodiment 10 due to the fact that the light sources 204 may not necessarily provide a beam perpendicular to the line of the light sources 204. The three equally spaced light sources, designated C', D' and E', are each separated by the distance 1. When scanned by the detector 90' three angles are measured. These are $\alpha_3$ which is a measure from an index point on the mobile unit 15' (usually the central axis B') to the light source 204 at point E'. Angle $\alpha_2$ is an angular measure from points E' and D' and angle $\alpha_1$, is a measure from points D' to C'.

It is known that the sum of interior angles of the triangle, i.e. $\alpha_1+\alpha_2+\alpha_4+\alpha_5=$ one hundred eighty degrees. Therefore, $\alpha_4=180-\alpha_1-\alpha_2-\alpha_5$ From the law of sines, $$\sin \alpha_5 = \frac{\sin \alpha_2}{\sin \alpha_1} \sin \alpha_4.$$

Combining yields:

$$\sin \alpha_5 = \frac{\sin \alpha_1 \sin (180 - \alpha_1 - \alpha_2 - \alpha_5)}{\sin \alpha_2}. \qquad I$$

Since $$\sin (180-x) = \sin (x),$$

$$\sin (A+B) = \sin (A) \cos (B) = \cos (A) \sin (B),$$

and $$\frac{\sin d'}{\cos d'} = \tan d',$$

then equation I ultimately yields $$\tan \alpha_5 = \frac{\sin \alpha_1 \sin (\alpha_1 + \alpha_2)}{\sin \alpha_2 - \sin \alpha_1 \cos (\alpha_1 + \alpha_2)}. \qquad II$$

$\alpha_5$ is thus found from equation II, and $\alpha_4$ is found by subtraction of $\alpha_1+\alpha_2+\alpha_5$ from 180 degrees.

The d', y' position of the assembly 206 with respect to the assembly 202 is found by:

$$2L = d' \tan (90-\alpha_4) + \tan (90-\alpha_5).$$

Therefore, $$d' \frac{2L}{\tan (90 - \alpha_4) + \tan (90 - \alpha_5)} \text{ and}$$

$$y' = d' \times \tan (90 - \alpha_4).$$

Finally, the orientation angle of the mobile unit 15' is $\theta' = \alpha_3 + 90 - \alpha_5$.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An optical positional sensing apparatus comprising:
a mobile assembly for mounting about a mobile unit adapted for shuttling between two locations;
a fixed assembly for mounting about a workstation to which said mobile unit will shuttle;
light source means for providing to the mobile assembly at least three discrete, spaced apart, light beams;
photodetection means mounted on the mobile assembly for detecting the angular position of each of said light beams relative to a central axis of said mobile assembly;
rotary means, mechanically coupled to the photodetection means for sweeping the photodetection means about an arc relative to the central axis of the mobile assembly, the rotary means including an encoder coupled thereto for sensing the angular position of the photodetection means relative to the central axis of the mobile assembly; and
electronic circuit means, electrically coupled to the photodetection means and to said encoder for receiving data therefrom, the electronic circuit means adapted for interpreting said data.

2. The apparatus of claim 1 wherein,
the light source means is mounted about the mobile assembly and includes a single laser light source and optics for directing the beam to the fixed assembly, said optics being mounted about the mobile assembly means to be coaxial with a central axis of rotation of the rotary means; and
the fixed assembly includes a first, a second, and a third reflective surface, said first reflective surface being positioned about the work station generally parallel to the axis of rotation of the rotary means and approximately the same height as said optics and photodetector, said second and said third reflective surfaces being affixed to said first reflective surface at each lateral edge thereof and perpendicular thereto to form a pair of corner reflectors.

3. The apparatus of claim 1 wherein,
the light source means is mounted about the fixed assembly and includes three discretely spaced point light sources.

4. The apparatus of claim 1 wherein,
the electronic circuit means includes a microprocessor.

5. An optical positional sensing apparatus comprising:
a mobile assembly, including a supporting framework for mounting about a mobile transport unit adapted for shuttling between a plurality of workstations within a particular environment;
a fixed optical reflector assembly for mounting about a workstation, and positioned remotely from said mobile assembly;
light source means attached to said supporting framework of the mobile assembly and adapted for producing a narrow, intense beam of light;
optical coupling means attached to said supporting framework for directing said beam of light to the fixed optical reflector, the optical coupling means further including rotary means for sweeping the beam in an arc relative to a central axis of the mobile assembly, encoder means coupled to the rotary means for sensing the angular position of the rotary means, and photodetector means coupled to the rotary means for detecting a light beam reflected by the fixed optical reflector; and
electronic circuit means, electrically coupled to the encoder means and photodetector means for receiving data therefrom, the electronic circuit means being adapted for interpreting said data.

6. The apparatus of claim 5 wherein,
the light source means includes a laser.

7. The apparatus of claim 6 wherein,
the optical coupling means includes a fixed mirror for directing a beam of light from said laser to a beam splitter, the fixed mirror and the beam splitter each arrayed at a forty-five degree angle to the vertical, the beam splitter adapted for directing a first portion of the beam toward the fixed optical assembly, and for directing the remaining portion of the beam perpendicular to the first portion of the beam; and the rotary means includes a housing rotatably mounted remotely to the light source means, the housing having at least one vertical wall, said wall including an aperture through which said beam from the beam splitter may pass, the housing including a drive motor coupled thereto for supplying rotary motion.

8. The apparatus of claim 7 wherein,
the beam splitting means includes a partially reflective mirror.

9. An optical positional sensing apparatus comprising:
a mobile assembly including a supporting framework for mounting about a mobile transport unit adapted for shuttling between a plurality of workstations within a specific environment;
a laser light source for producing a narrow, coherent light beam, the laser light source being oriented horizontally about said supporting framework to be colinear with a central axis of said mobile assembly;
a fixed mirror secured to the framework and centered about the light beam emanating from the laser, the fixed mirror being positioned at a forty-five degree angle to direct the beam vertically upwards, the fixed mirror including adjusting means formed thereto for precisely aligning the beam;
a rotating housing rotatably mounted on said framework and having a central axis of rotation positioned directly over the fixed mirror, the housing being rotatably driven in a reciprocating manner by a motor and gear train coupled thereto and mounted on the supporting framework whereby the housing may be rotated back and forth in an arc of at least one hundred and eighty degrees, the housing including a rotary encoder mounted about the supporting framework and coupled to the rotating housing, the encoder being adapted to sense and signal an angular position of the housing with respect to the central axis of the mobile assembly, the housing further including a disk-shaped top having a central aperture formed therein, a disk-shaped bottom having a central aperture formed therein, and a lateral window for allowing transmission of light perpendicular to said axis of rotation of the housing;
a beam splitter comprising a partially reflective mirror mounted within the housing to be centered over the axis of rotation thereof, the beam splitter being mounted at a forty-five degree angle from the vertical, and directly towards said window whereby light from the fixed mirror impinges on the beam splitter and is partially directed horizontally outwards through said window, a remaining portion of the light being transmitted vertically through the beam splitter and the top central aperture, the beam splitter further including adjusting means formed thereto for adjusting the precise angle thereof;
a split detector, mounted within said rotary housing about a vertical wall thereof, the detector being positioned parallel to a lateral axis of said window and behind the beam splitter and having a center point colinear with a center of the beam splitter whereby a light beam entering through said window will pass through the beam splitter and impinge upon the split detector, the split detector being adapted for generating a signal indicating a light beam is exactly centered thereon;
a microprocessor, electrically coupled to the split detector and to said rotary encoder for computing an approach angle and position of said mobile assembly by measuring angles of three reflected light beams originating from said light source relative to the central axis of the mobile assembly; and
a fixed optical assembly, positioned remotely from and noncontiguously to said mobile assembly, the fixed optical assembly including a first reflective surface and a second and a third reflective surface, each affixed to a lateral edge of the first reflective surface and perpendicular thereto, said fixed optical assembly being approximately parallel to said axis of rotation of the housing, and equal in height to said aperture of the rotating assembly whereby light originating from the window of the mobile assembly may impinge upon the optical assembly and be reflected back to the split detector of the mobile assembly.

10. The apparatus of claim 9 wherein,
the split detector comprises a first half and a second half of photosensitive material, coplanar and positioned close together but not touching, each half being adapted for producing an electrical current varying with the amount of light striking the half whereby when a light beam strikes both halves equally, equal current will be generated.

* * * * *